(12) United States Patent
Huang et al.

(10) Patent No.: US 11,200,734 B2
(45) Date of Patent: Dec. 14, 2021

(54) METHOD FOR RECONSTRUCTING THREE-DIMENSIONAL SPACE SCENE BASED ON PHOTOGRAPHING

(71) Applicant: SHANGHAI YIWO INFORMATION TECHNOLOGY CO., LTD., Shanghai (CN)

(72) Inventors: Xiaomin Huang, Shanghai (CN); Ming Zhao, Shanghai (CN); Pei Cai, Shanghai (CN)

(73) Assignee: SHANGHAI YIWO INFORMATION TECHNOLOGY CO., LTD., Shanghai (CN)

( * ) Notice: Subject to any disclaimer, the term of this patent is extended or adjusted under 35 U.S.C. 154(b) by 10 days.

(21) Appl. No.: 16/588,111

(22) Filed: Sep. 30, 2019

(65) Prior Publication Data

US 2020/0111250 A1 Apr. 9, 2020

Related U.S. Application Data

(63) Continuation of application No. PCT/CN2018/112554, filed on Oct. 30, 2018.

(30) Foreign Application Priority Data

Jul. 3, 2018 (CN) .......................... 201810717163.X

(51) Int. Cl.
  *G06T 17/00* (2006.01)
  *G06T 7/62* (2017.01)
  (Continued)

(52) U.S. Cl.
  CPC .............. *G06T 17/00* (2013.01); *G06T 3/608* (2013.01); *G06T 7/62* (2017.01); *G06T 7/70* (2017.01);
  (Continued)

(58) Field of Classification Search
  CPC .. G06T 17/00; G06T 7/62; G06T 7/70; G06T 3/608; G06T 11/206; G06T 15/04;
  (Continued)

(56) References Cited

U.S. PATENT DOCUMENTS

2009/0244062 A1* 10/2009 Steedly ................... G06T 7/564
345/420
2009/0279784 A1 11/2009 Arcas et al.
(Continued)

FOREIGN PATENT DOCUMENTS

CN 1539120 A 10/2004
CN 101281034 A 10/2008
(Continued)

OTHER PUBLICATIONS

Hedau, V., Hoiem, D., Forsyth, D.: Recovering the spatial layout of cluttered rooms. In: ICCV. (2009).*
(Continued)

*Primary Examiner* — Jin Ge
(74) *Attorney, Agent, or Firm* — Seed IP Law Group LLP

(57) ABSTRACT

A method for reconstructing a three-dimensional space scene based on photographing is disclosed, comprising the following steps: S1, importing photos of all spaces, and making the photos correspond to a three-dimensional space according to directions and viewing angles during capture, so that a viewing direction of each pixel, when viewed from the camera position of the three-dimensional space, is in line with that during capture; S2, regarding a room as a set of multiple planes, determining a first plane, and then determining all the planes one by one according to relationships and intersections between the planes; S3, marking a spatial structure of the room by a marking system and obtaining dimension information; and S4, establishing a three-dimensional space model of the room by point coordinate infor-
(Continued)

mation collected in the step S3. In the present disclosure, the three-dimensional space model of a scene including dimensions and texture can be restored with no details lost; meanwhile, the three-dimensional space scene can be edited and modified quickly and conveniently, and a two-dimensional floor plan with dimensions and adequate accuracy can also be generated.

20 Claims, 6 Drawing Sheets

(51) Int. Cl.
  *G06T 7/70* (2017.01)
  *G06T 3/60* (2006.01)
  *G06T 15/04* (2011.01)
  *G06T 19/00* (2011.01)
  *H04N 5/232* (2006.01)

(52) U.S. Cl.
  CPC .............. *G06T 15/04* (2013.01); *G06T 19/00* (2013.01); *H04N 5/23238* (2013.01); *G06T 2207/20164* (2013.01); *G06T 2210/21* (2013.01); *G06T 2210/56* (2013.01); *G06T 2215/16* (2013.01); *G06T 2219/004* (2013.01); *G06T 2219/008* (2013.01); *G06T 2219/012* (2013.01)

(58) Field of Classification Search
  CPC ........... G06T 19/00; G06T 2207/20164; G06T 2210/56; G06T 2215/16; G06T 2219/004; G06T 2219/008; G06T 2219/012; G06T 2210/21; H04N 5/23238
  USPC ......................................................... 345/419
  See application file for complete search history.

(56) References Cited

U.S. PATENT DOCUMENTS

| | | | | |
|---|---|---|---|---|
| 2013/0100128 | A1* | 4/2013 | Steedly | G06T 7/536 345/419 |
| 2014/0301633 | A1* | 10/2014 | Furukawa | G06T 17/00 382/154 |
| 2014/0333615 | A1* | 11/2014 | Ramalingam | G06T 17/00 345/420 |
| 2015/0227644 | A1* | 8/2015 | Schultz | G06T 19/00 703/1 |
| 2016/0042521 | A1 | 2/2016 | Boardman et al. | |
| 2016/0092608 | A1* | 3/2016 | Yamamoto | G06T 17/00 703/1 |
| 2018/0089797 | A1* | 3/2018 | Upendran | G06T 7/12 |
| 2018/0315162 | A1* | 11/2018 | Sturm | H04N 13/239 |
| 2019/0258868 | A1* | 8/2019 | Gornick | G06T 7/292 |
| 2019/0272655 | A1* | 9/2019 | Santos | G01S 17/86 |
| 2019/0340433 | A1* | 11/2019 | Frank | G06T 7/254 |
| 2019/0392622 | A1* | 12/2019 | Santos | G01C 15/002 |
| 2020/0082617 | A1* | 3/2020 | Tung | G06T 17/00 |

FOREIGN PATENT DOCUMENTS

| | | |
|---|---|---|
| CN | 103955960 A | 7/2014 |
| CN | 104240289 A | 12/2014 |
| CN | 104851127 A | 8/2015 |
| CN | 105279787 A | 1/2016 |
| CN | 106780421 A | 5/2017 |
| CN | 107248193 A | 10/2017 |
| CN | 107798725 A | 3/2018 |
| CN | 107978017 A | 5/2018 |
| CN | 108053473 A | 5/2018 |
| FR | 2787612 B1 | 3/2001 |

OTHER PUBLICATIONS

Zhong, "A Photo Based 3D Garment Making System for Educational Purposes in Style Reconstruction and Evaluation", 6th International Conference on Computer Science & Education (ICCSE 2011), SuperStar Virgo, Singapore, 2011, (4 pages).

Maxiao, "Photographic 3D Scanning System Based on Robot Vision", School of Information & Engineering of Yangzhou, Oct. 2015 (66 pages).

\* cited by examiner

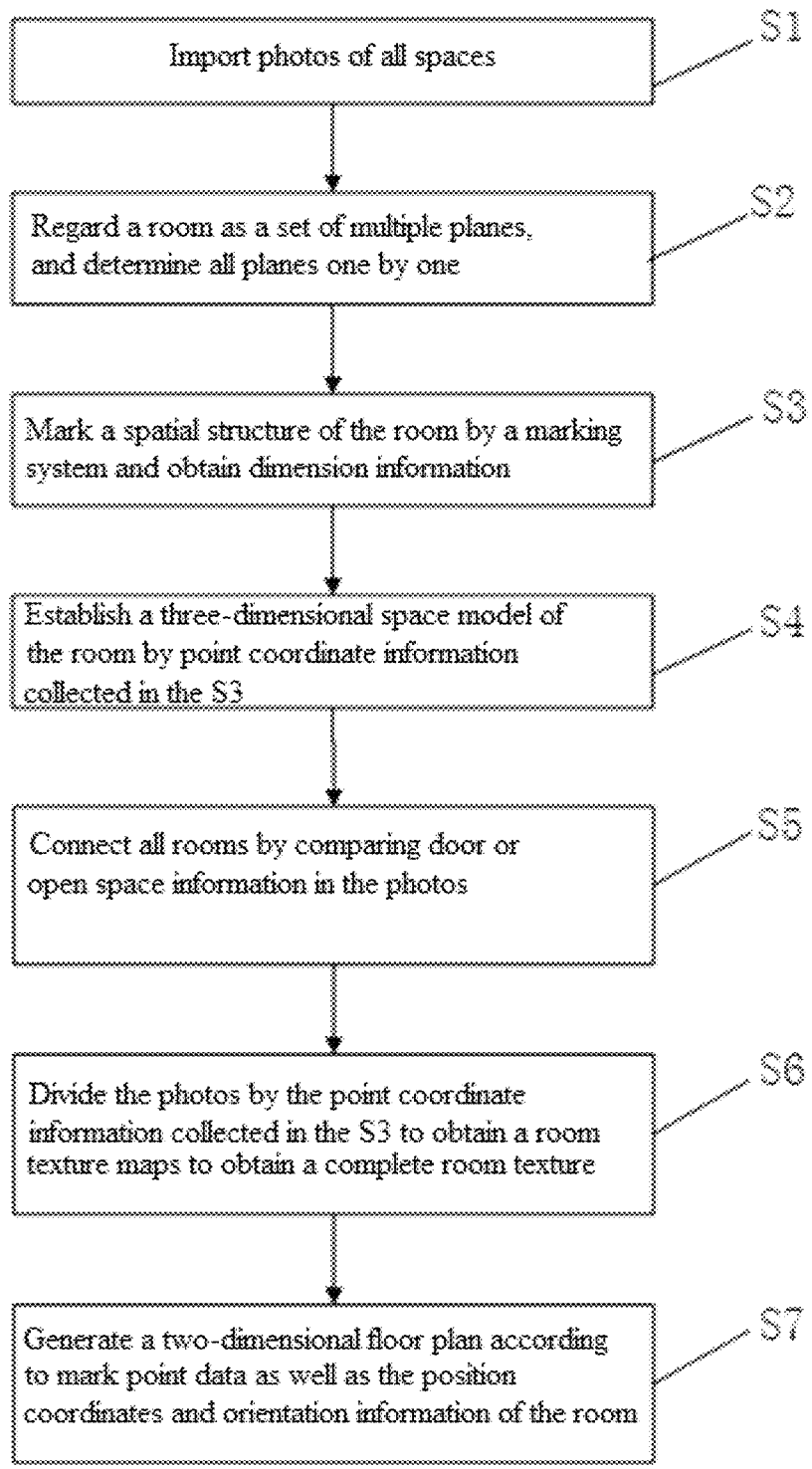
Fig. #1

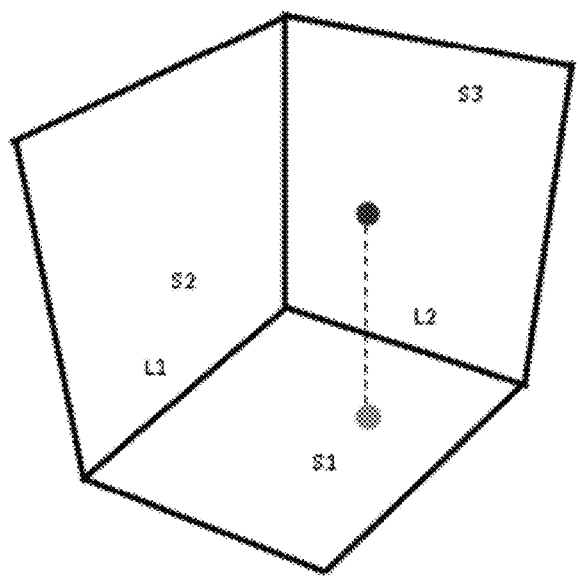
Fig. #2
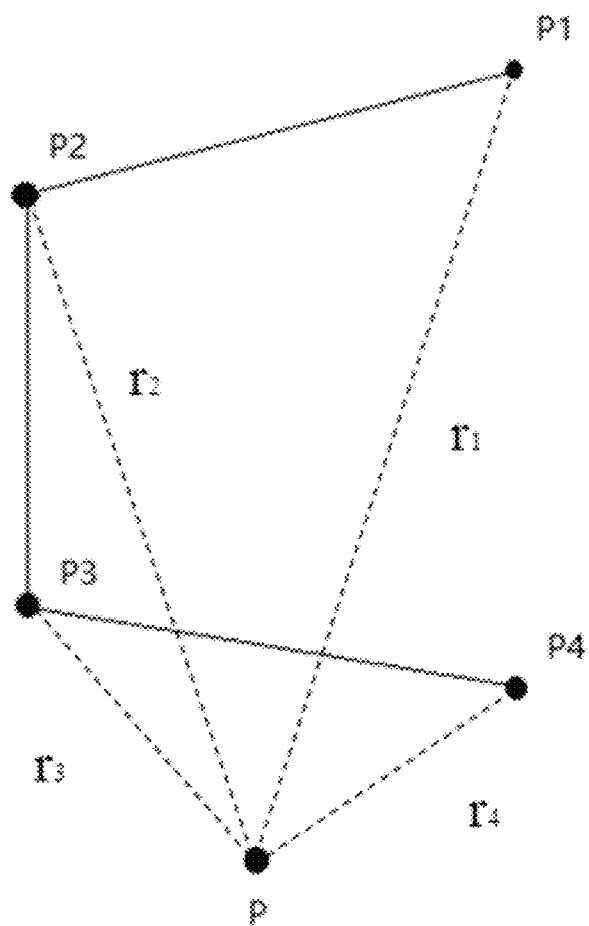
Fig. #3

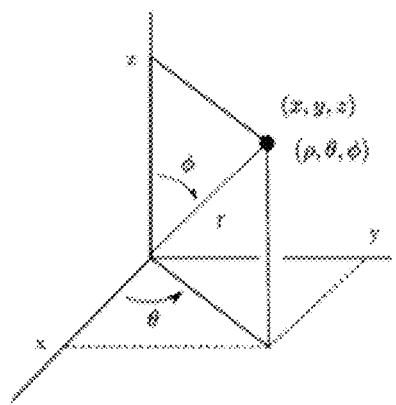
*Fig. #4*
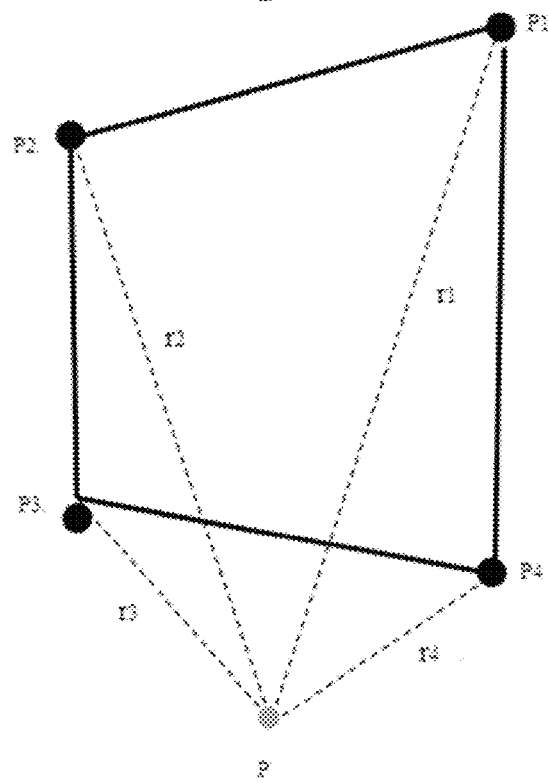
*Fig. #5*
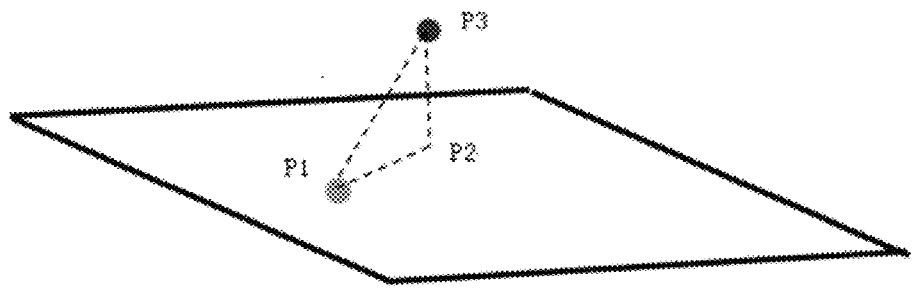
*Fig. #6*

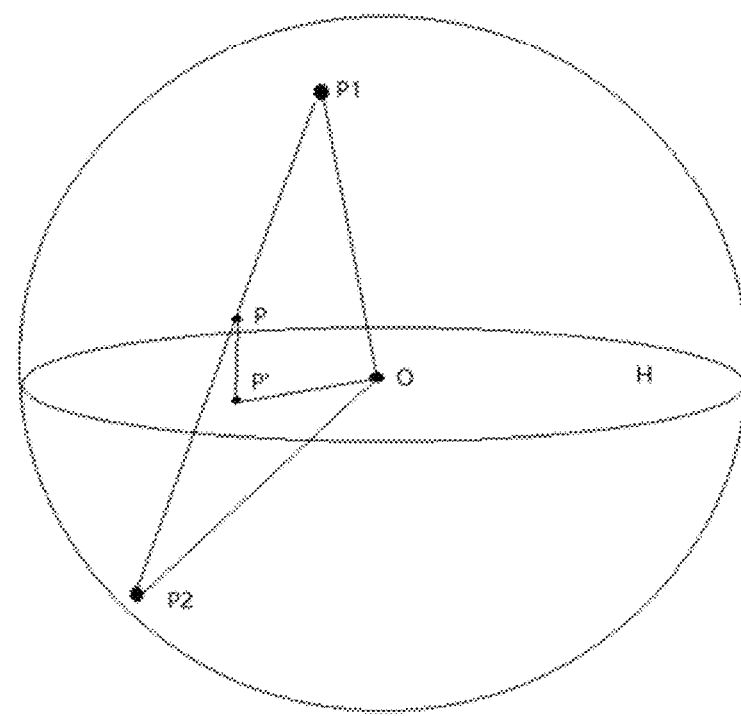
*Fig. #7*
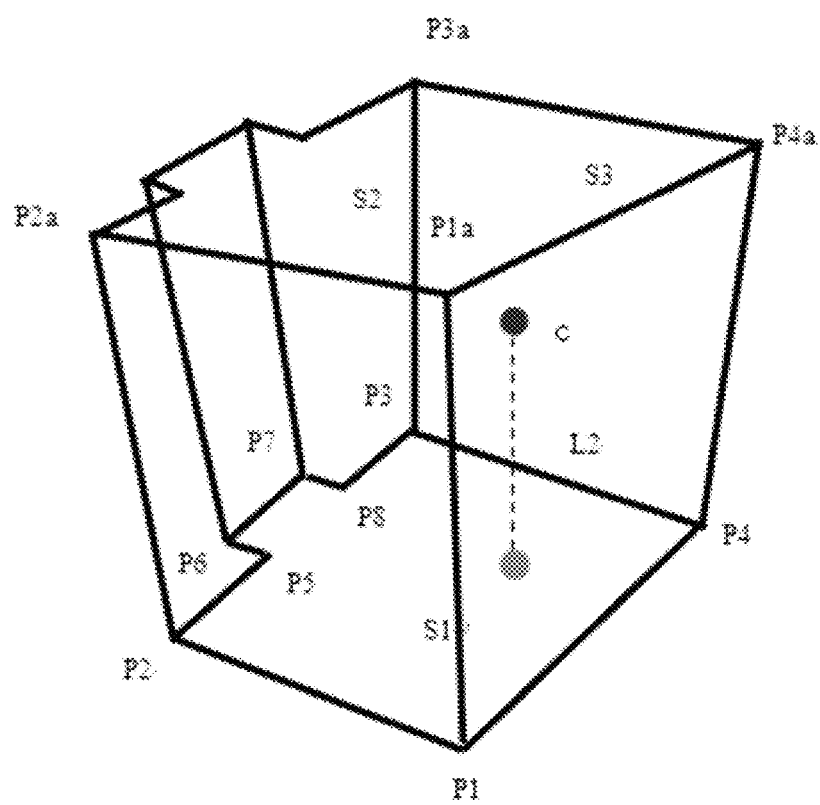
*Fig. #8*

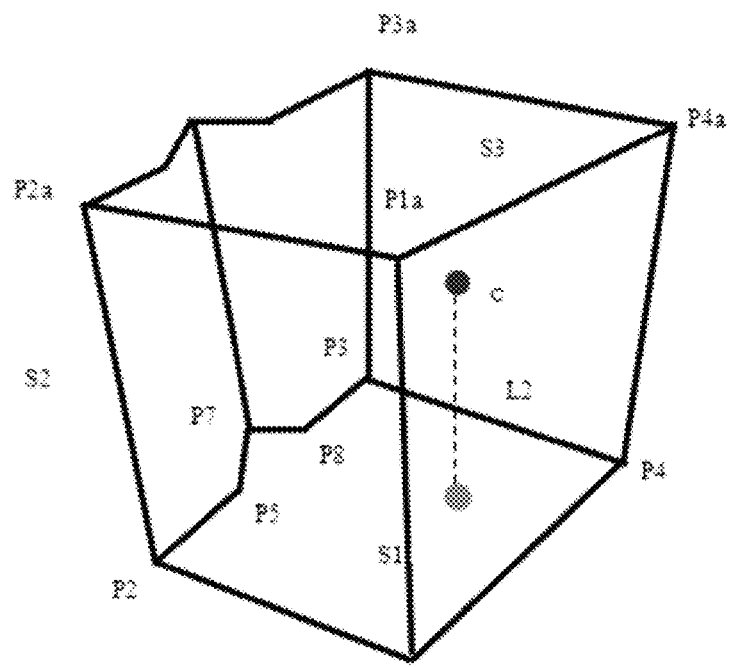
*Fig. #9*
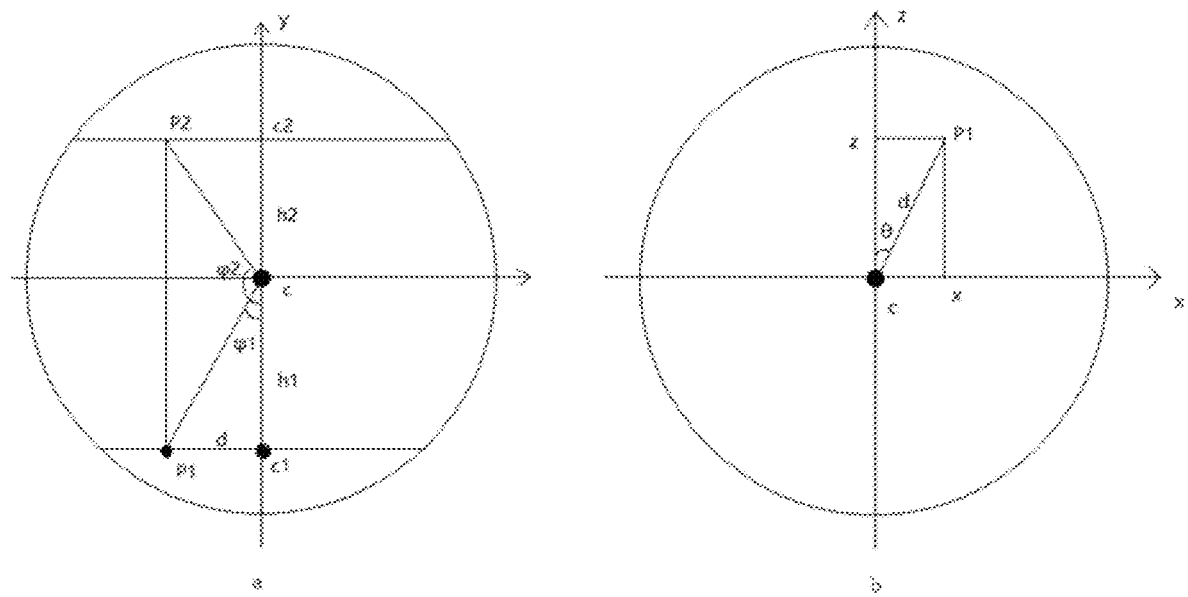
*Fig. #10*

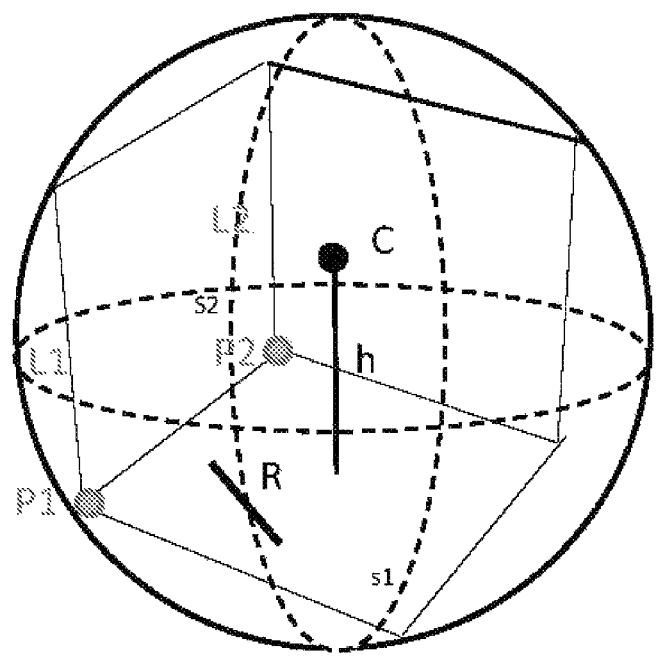
*Fig. #11*
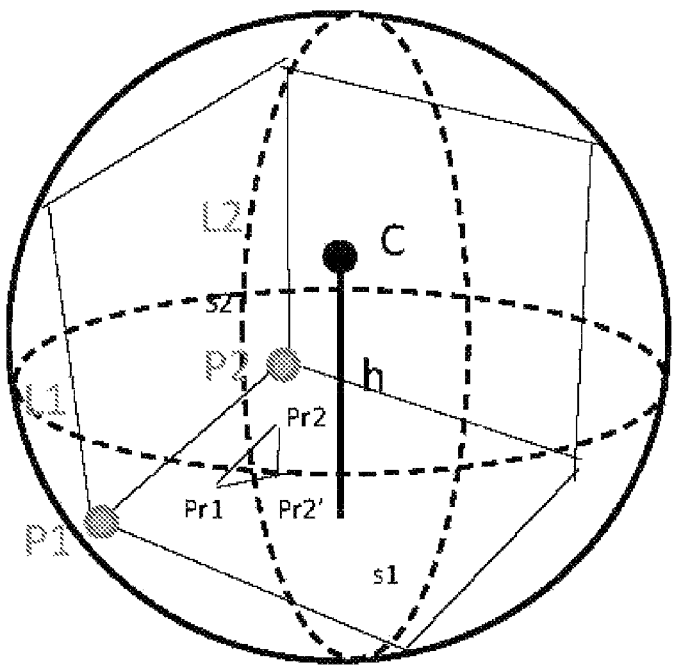
*Fig. #12*

METHOD FOR RECONSTRUCTING THREE-DIMENSIONAL SPACE SCENE BASED ON PHOTOGRAPHING

BACKGROUND

Technical Field

The present disclosure relates to a three-dimensional modeling method, and in particular, to a method for reconstructing a three-dimensional space scene based on photographing.

Description of the Related Art

Modeling of a three-dimensional space is a technology that has been rapidly developed and applied in recent years. It has been widely used in the fields of virtual reality, house decoration, interior design, etc. The existing three-dimensional space scene modeling generally adopts the following schemes.

1. A binocular stereo vision system, which is a method based on the parallax principle and using an imaging device to obtain two images of an object to be measured from different positions and then obtain three-dimensional geometric information of the object from disparities between matching points of the two images. Images obtained by two eyes are merged and the difference between them is observed, so that a clear sense of depth can be obtained. Features are identified and matched so that physical points of the same space can be identified and matched from image points in different images. This method uses a simple capture device; however, an extremely large number of photos needs to be taken for reconstructing of a three-dimensional space, which is very time consuming, and it takes a lot of time to calculate the model subsequently. Moreover, once the model goes wrong, the repair method is very complicated and cannot be operated by a non-professional person. Therefore, the binocular stereo vision system cannot be widely used although it has appeared for many years.

2. A laser point cloud technology, which uses time of flight (TOF) or the structured light method to obtain spatial coordinates of each sampling point on the surface of an object, thereby obtaining a set of massive points that express spatial distribution of a target and surface characteristics of the target. The point set is referred to as "point cloud." The point cloud has attributes including spatial resolution, point precision, surface normal vector, and so on. However, the laser point cloud technology requires users to purchase point cloud equipment that is bulky, expensive and complicated to operate on the one hand, and on the other hand, it will generate massive data, which is not conducive to storage and processing. When multiple groups of data need to be spliced, it will take a long time due to the huge amount of data, and the effect is unsatisfactory. Therefore, it is difficult to popularize the point cloud technology although it has appeared for many years.

As can be seen from the above, there is still a lack of a simple and easy-to-use method with a low cost but desirable effects to solve the above problems.

BRIEF SUMMARY

The technical problem to be solved by the present disclosure is to provide a method for reconstructing a three-dimensional space scene based on photographing, in which a three-dimensional space model of a scene including texture and dimensions can be restored with no details lost; meanwhile, the three-dimensional space scene can be edited and modified quickly and conveniently, and a two-dimensional floor plan can also be generated with adequate accuracy and dimensions.

The technical solution adopted by the present disclosure to solve the above technical problem is to provide a method for reconstructing a three-dimensional space scene based on photographing, which comprises the following steps: S1, importing photos of all spaces by importing, for each space, a group of photos including major features of the space taken at the same capture point, and making the photos correspond to a three-dimensional space according to directions and viewing angles during capture, so that a viewing direction of each pixel, when viewed from the camera position of the three-dimensional space, is in line with that during capture; S2, regarding a room as a set of multiple planes, determining a first plane, and then determining all the planes one by one according to relationships and intersections between the planes; S3, marking a spatial structure of the room by a marking system and obtaining dimension information; and S4, establishing a three-dimensional space model of the room by point coordinate information collected in the S3.

In the method for reconstructing a three-dimensional space scene based on photographing, the step S1 further includes combining the photos of all the spaces into a 360-degree panoramic image, and making the panoramic image correspond to the three-dimensional space, so that the viewing direction of each pixel, when viewed from the camera position of the three-dimensional space, is in line with that during capture.

In the method for reconstructing a three-dimensional space scene based on photographing, in the step S2, the method of determining a first plane includes determining a plane by searching for three perpendicularly intersecting wall lines on the planes or determining a plane by searching for four corners of a plane.

In the method for reconstructing a three-dimensional space scene based on photographing, in the step S2, the method of determining a first plane further includes determining the position of the plane by recording a projection point of a camera lens on the plane, or determining the position of the plane by recording a relevant point to reckon a projection point of a camera lens on the plane.

In the method for reconstructing a three-dimensional space scene based on photographing, before the step S2, the method further comprises marking a vertical correction line on the photo to correct an image tilt caused by the skew of a capture device during capture; finding a line perpendicular to the ground in the photo as the vertical correction line, or finding a horizontal line in the photo, and drawing a line perpendicular to the horizontal line in the photo as the vertical correction line; rotating the photo with the vertical correction line as a reference until the vertical correction line is perpendicular to the actual horizontal plane; and acquiring multiple vertical correction lines in different orientations to complete vertical correction.

In the method for reconstructing a three-dimensional space scene based on photographing, the step S3 includes the following steps: S31, placing the photos in a high-precision sphere, setting the lens position of a camera in the center of the sphere, and then restoring the capture viewing angles of the photos in the center of the sphere; S32, presetting four frame points in the sphere, each including an upper point and a lower point, and dragging the frame points such that each point corresponds to a corner position in an actual room space to form a main frame structure of the room; or marking positions of all lower corners sequentially to form a floor outline, then finding out corresponding upper corners in combination with perpendicular wall lines, and marking positions of the upper corners to obtain a basic outline of the whole room; and S33, calculating the height of the room by a known camera capture height, and reckoning the dimensions of room outline; or locating the dimensions of the outline of a plane by placing a scale of a known length, and reckoning the dimensions of the room outline.

In the method for reconstructing a three-dimensional space scene based on photographing, in the step S32, when a corner to be marked is obscured, the position of the corner is determined by an intersection point of a vertical wall line and a horizontal wall line intersecting with each other if the wall lines are visible; if the lower corner and wall line of the wall are both obscured and an upper corner or wall line is visible, an upper plane and the upper corner are determined first, the positions of the upper corner and the lower corner are then scaled proportionally, and the lower corner point is kept on a lower plane, so that the position of the corner can be determined.

In the method for reconstructing a three-dimensional space scene based on photographing, the step S32 further includes adding mark points for objects in the room, using two mark points to form a mark line to expand the walls of the room, and adding basic object structures of the room, wherein the basic object includes a door, an open space, a normal window, a bay window, and stairs; for a non-rectangular room, adding mark points of a concave-convex wall structure to expand the room structure, and determining the expanded spatial structure by adjusting the position and depth of the concave-convex wall; for any free-structured wall, adding free mark points to expand the wall structure without any restriction; and for a structure of more than one floor, adding mark points for stairs and staircase structures, and connecting the staircases of two floors to connect the upper and lower floors to expand the stair structure; and the step S33 further includes obtaining a calculation ratio of the dimensions in the real world to the dimensions in the model by marking the objects in the room with the known height of the camera lens or the placed scale of a known length, and scaling the entire model proportionally to calculate actual dimensions of the objects in the room.

The method for reconstructing a three-dimensional space scene based on photographing further comprises step S5, connecting all rooms by comparing image information of doors or open spaces in photos of different rooms to obtain the spatial position and orientation information of each room; comparing pictures through marked doors or open spaces in the photos, obtaining matching pictures in the photos, finding out the same doors or open spaces, and connecting the rooms having the same doors or open spaces; calculating the positions and orientations of the connected rooms after all rooms are connected to each other, selecting a room as a connected room, traversing doors of the room to look for an unconnected room, calculating the position and orientation of the unconnected room through the position and orientation of the currently connected room in combination with the position and orientation of a door or an open space connecting the two rooms, and marking the unconnected room as a connected room; and continuing to look for an unconnected room until there is no unconnected room to complete the connection of all rooms.

The method for reconstructing a three-dimensional space scene based on photographing further comprises step S6, dividing the photos by the point coordinate information collected in the step S3 to obtain a room texture map to obtain a room texture in the following way: first setting each plane as a polygon with a set of three-dimensional coordinates as vertices, and calculating the size of a map by a bounding rectangle of the vertex coordinates; traversing pixel by pixel on the image, and acquiring its spatial coordinates on the polygon; traversing all the pixel points to complete a texture map of a single plane; and completing texture maps for all planes of the room sequentially.

The method for reconstructing a three-dimensional space scene based on photographing further comprises step S7, obtaining a two-dimensional outline of a single room through the room model acquired by the marking system in the step S3, with height information ignored; and setting the position and orientation of each room outline according to the position coordinates and orientation information of each room obtained in the step S5, to generate the two-dimensional floor plan.

In the method for reconstructing a three-dimensional space scene based on photographing, the capture device of the photos includes a mobile phone with a fisheye lens, a panoramic camera, a camera with a fisheye lens, a general mobile phone, and a general digital camera.

Compared with the prior art, the present disclosure has the following beneficial effects: in the method for reconstructing a three-dimensional space scene based on photographing according to the present invention, a three-dimensional space model of a scene including texture and dimensions can be restored with no details lost; no incomplete 3D models will be generated due to incomplete scanning; furniture, interior decoration, or the like will not cause any errors in generating 3D models. The three-dimensional space scene can be edited and modified quickly and conveniently, and a two-dimensional floor plan with dimensions and adequate accuracy can be generated at the same time. The method supports a wide range of capture manners including, but not limited to, a mobile phone with a fisheye lens, a panoramic camera, a camera with a fisheye lens, a general mobile phone, and a general digital camera, thus having a low cost.

BRIEF DESCRIPTION OF THE SEVERAL VIEWS OF THE DRAWINGS

FIG. 1 is a flowchart of a method for reconstructing a three-dimensional space scene based on photographing according to an embodiment of the present invention;

FIG. 2 is a schematic diagram of determining a plane according to an embodiment of the present invention;

FIG. 3 is a schematic diagram of determining a first plane by searching for three perpendicularly intersecting wall lines on a plane according to an embodiment of the present invention;

FIG. 4 is a schematic diagram of conversion from polar coordinates to rectangular coordinates according to an embodiment of the present invention;

FIG. 5 is a schematic diagram of determining a first plane by searching for four corners of a plane according to an embodiment of the present invention;

FIG. 6 is a schematic diagram of determining a first plane by recording a relevant point to reckon a projection point of a camera lens on a plane according to an embodiment of the present invention;

FIG. 7 is a schematic diagram of vertical correction according to an embodiment of the present invention;

FIG. 8 is a schematic diagram of marking a spatial structure of a room and adding a concave-convex wall structure according to an embodiment of the present invention;

FIG. 9 is a schematic diagram of marking a spatial structure of a room and adding free mark points to expand a wall without any restriction according to an embodiment of the present invention;

FIG. 10 illustrates a side view (10*a*) and a top view (10*b*) of a corner viewed from a camera according to an embodiment of the present invention;

FIG. 11 is a schematic diagram of reckoning outline dimensions by placing a scale of a known length on the ground according to an embodiment of the present invention; and FIG. 12 is a schematic diagram of reckoning outline dimensions by placing a scale of a known length to form an angle with the ground according to an embodiment of the present disclosure.

DETAILED DESCRIPTION

In order to make the above described objectives, features and beneficial effects of the present disclosure clearer and more comprehensible, specific embodiments of the present disclosure are illustrated below with reference to the accompanying drawings.

FIG. 1 is a flowchart of a method for reconstructing a three-dimensional space scene based on photographing according to the present disclosure. In some embodiment, the flowchart of FIG. 1 is implemented by a system that includes a cloud-based server and one or more terminal devices communicatively coupled to the cloud-based server via, e.g., a network. The terminal device includes one or more cameras configured to capture two-dimensional images of an object. Examples of an object may be an interior space of a room or a building, an exterior profile of an architectural structure, a piece of furniture in a room, or other objects. In some embodiments, the terminal device also includes various sensors for detecting the environment of the terminal devices. For example, the terminal device includes a barometer configured to detect a height of the terminal device or the camera of the terminal device with respect to a floor where a human holding the terminal device stands on. The terminal device also includes other motion sensors, like accelerometers or gyroscopes to sense the motions of the terminal device or the camera.

The cloud-based server includes a processor and a server application dedicated for reconstructing a three-dimensional model of an object based on the two-dimensional images of object as captured by the camera of the terminal devices. In some embodiments, the terminal device includes a user application dedicated to capturing images of an object based on requirements of the server application in reconstructing the three-dimensional model. In some other embodiment, the terminal device captures images of an object independently to the cloud-based server and sends the captured images to the cloud-based server for further analysis and processing.

Referring to FIG. 1, a method for reconstructing a three-dimensional space scene based on photographing according to the present disclosure includes the following steps: S1, importing photos of all spaces by importing, for each space, a group of photos including major features of the space taken at the same capture point, and making the photos correspond to a three-dimensional space according to directions and viewing angles during capture, so that a viewing direction of each pixel, when viewed from the camera position of the three-dimensional space, is in line with that during capture; S2, regarding a room as a set of multiple planes, determining a first plane, and then determining all the planes one by one according to relationships and intersections between the planes; S3, marking a spatial structure of the room by a marking system and obtaining dimension information; and S4, establishing a three-dimensional space model of the room by point coordinate information collected in the step S3.

Preferably, the step S1 further includes combining the photos of all the spaces into a 360-degree panoramic image, and then making the panoramic image correspond to the three-dimensional space, so that the viewing direction of each pixel, when viewed from the camera position of the three-dimensional space, is in line with that during capture.

In the method for reconstructing a three-dimensional space scene based on photographing according to the present disclosure, in the step S2, the method of determining a first plane includes determining a plane by searching for three perpendicularly intersecting wall lines on the planes or determining a plane by searching for four corners of a plane. The method of determining a first plane method further includes determining the position of the plane by recording a projection point of a camera lens on the plane or determining the position of the plane by recording a relevant point to reckon a projection point of a camera lens on the plane.

In some embodiments, a joint point of three perpendicularly intersecting wall lines may be first determined. The three perpendicularly intersecting wall lines may be determined based on the determined joint point. In some embodiments, a convolutional neutral network (CNN), or other artificial intelligence algorithms, is used to autonomously determine a joint point and/or three perpendicularly intersecting wall lines based on two-dimension images of an internal space. For example, a two-dimensional image of an internal space, e.g., a room, may be set as an input to the CNN, and a joint point may then be predicted by the CNN. The parameters of the CNN algorithm may be trained using two-dimensional images of internal spaces with marked or known joint points and marked or known perpendicularly intersecting wall lines. The training of the CNN parameters may be conducted continually using new two-dimensional images with known or marked joint points. The prediction results of the CNN may be manually checked to validate the prediction results. The validation results may then be used to update the parameters of the CNN algorithm for determining the joint points and perpendicularly intersecting wall lines of an internal space.

The principle of making a photo correspond to a three-dimensional space is to maintain each pixel to be in the same direction as that during capture, without recording or providing distance information from a pixel to the capture point (the lens position during capture). The basic principle of modeling is to regard an indoor model as a set of multiple planes (including the ground, walls, and the ceiling), a lower corner as an intersection of three planes (the ground and two walls), an upper corner as an intersection of three planes (the ceiling and two walls), and a wall line as an intersection of two planes (walls). If one plane can be located first, other planes can be determined sequentially according to corners and lines on the plane until all planes are restored to complete the modeling.

Referring to FIG. 2, if the ground S1 can be determined first, a wall S2 can be determined according to a known perpendicular relationship between the wall S2 and the ground S1, as well as an intersection line (wall line) L1 of S1 and S2. Similarly, a wall line L2 can be used to determine a wall S3 and then further determine all mutually perpendicular walls in the space.

Specifically, in some embodiments (adjacent right-angle method), a plane is determined by three perpendicularly intersecting lines on the plane. The premise of this method is that most of indoor walls are rectangles.

Referring to FIG. 3, P is the position of a camera lens, and angles formed by P1P2P3 and P2P3P4 are both right angles, then a plane where P1P2P3P4 is located can be determined. In FIG. 3, a wall is observed in a photo, and P1, P2, P3 and P4 are all on the wall. Here, P2P3 is an edge of the wall perpendicular to the ground, P1P2 is an intersection line of the wall and the ceiling, and P3P4 is an intersection line of the wall and the ground. P1 is a point different from P2 on the intersection line of the wall and the ceiling, and P4 is a point different from P3 on the intersection line of the wall and the ground. Coordinates of the four points relative to the observation point are expressed in polar coordinates as ($r_n$, $\varphi_n$, $\theta_n$). Obviously, the radius $r_n$ is an unknown number, and the other two values can be observed.

Referring to FIG. 4, the conversion from polar coordinates to rectangular coordinates is defined as follows:

$$\begin{pmatrix} \sin\varphi\cos\theta \\ \sin\varphi\sin\theta \\ \cos\varphi \end{pmatrix} \cdot r = \begin{pmatrix} x \\ y \\ z \end{pmatrix} \quad (1)$$

If it is defined that $$\begin{pmatrix} \sin\varphi\cos\theta \\ \sin\varphi\sin\theta \\ \cos\varphi \end{pmatrix} = M, \quad (2)$$

the point $P_n = M_n \cdot r_n$ (3).

It is assumed that a line segment vector $V_{mn} = P_n - P_m$ (4).

Referring to FIG. 3, since P1P2 is perpendicular to P2P3, it can be known that the dot product of the two line segment vectors is 0:

$$V_{21} \cdot V_{32} = \quad (5).$$

Similarly, since P3P4 is perpendicular to P2P3, it can be obtained that $$V_{43} \cdot V_{32} = \quad (6).$$

Further, since P1P2 is parallel to P3P4, the dot product of the two vectors is equal to the product of moduli of the two vectors $$V_{21} \cdot V_{43} = \|V_{21}\| \cdot \|V_{43}\| \quad (7).$$

The formulas (5), (6), and (7) are expanded to get $$V_{21} \cdot V_{32} = \quad (8)$$
$$(P_2 - P_1) \cdot (P_3 - P_2) = (M_2 \cdot r_2 - M_1 \cdot r_1) \cdot (M_3 \cdot r_3 - M_2 \cdot r_2) = 0$$

$$V_{32} \cdot V_{43} = \quad (9)$$
$$(P_3 - P_2) \cdot (P_4 - P_3) = (M_3 \cdot r_3 - M_2 \cdot r_2) \cdot (M_4 \cdot r_4 - M_3 \cdot r_3) = 0$$

$$V_{21} \cdot V_{43} = (P_2 - P_1) \cdot (P_4 - P_3) = \quad (10)$$
$$(M_2 \cdot r_2 - M_1 \cdot r_1) \cdot (M_4 \cdot r_4 - M_3 \cdot r_3) = \|V_{21}\| \cdot \|V_{43}\| =$$
$$\sqrt{r_2^2 + 2M_1 \cdot M_2 r_1 r_2 + r_1^2} \cdot \sqrt{r_4^2 + 2M_4 \cdot M_3 r_4 r_3 + r_3^2}$$

There are three equations but 4 unknowns, so the above equations cannot be solved directly. However, it can be assumed that $r_2$ is 1, and a ratio of r to $r_2$ can be obtained for the other three points. The plane and camera positions are thus learned.

$r_2 = 1$ is substituted into (8) to get $$r_1 = \frac{1 - M_2 \cdot M_3 r_3}{M_1 \cdot M_2 - M_1 \cdot M_3 r_3}. \quad (11)$$

If $M_n \cdot M_m = W_{nm}$ (12) is defined, the following can be got:

$$r_1 = \frac{1 - W_{23} r_3}{W_{12} - W_{13} r_3}. \quad (12)$$

Similarly, the following can be got:

$$r_4 = \frac{r_3^2 - W_{23} r_3}{W_{34} r_3 - W_{24}}. \quad (13)$$

(12) and (13) are substituted into (10) to get $$\frac{[M_2(W_{12} - W_{13} r_3) - M_1(1 - W_{23} r_3)] \cdot [M_4(r_3^2 - W_{23} r_3) - M_3(W_{34} r_3 - W_{24}) r_3]}{(W_{12} - W_{13} r_3) \cdot (W_{34} r_3 - W_{24})} = \quad (14)$$

$$\sqrt{\frac{(W_{12} - W_{13} r_3)^2 + 2W_{12}(1 - W_{23} r_3)(W_{12} - W_{13} r_3) + (1 - W_{23} r_3)^2}{(W_{12} - W_{13} r_3)^2}} \cdot$$

$$\sqrt{\frac{(r_3^2 - W_{23} r_3)^2 + 2W_{23}(W_{34} r_3 - W_{24})(r_3^2 - W_{23} r_3) r_3 + W_{34} r_3 - W_{24}^2}{(W_{34} r_3 - W_{24})^2}}.$$

Both sides of (14) are squared and divided by $r_3^2$ to get (15)

$$\{[M_2(W_{12} - W_{13} r_3) - M_1(1 - W_{23} r_3)] \cdot [M_4(r_3^2 - W_{23} r_3) - M_3(W_{34} r_3 - W_{24}) r_3]\}^2 = [(W_{12} - W_{13} r_3)^2 + 2W_{12}(1 - W_{23} r_3)(W_{12} - W_{13} r_3) + (1 - W_{23} r_3)^2].$$

$$[(r_3^2 - W_{23} r_3)^2 + 2W_{23}(W_{34} r_3 - W_{24})(r_3^2 - W_{23} r_3) r_3 + W_{34} r_3 - W_{24}^2].$$

This is a quartic equation for $r_3$, and four values of $r_3$ can be obtained by solving this equation. A rooting formula of a quartic equation with one unknown can be obtained by multiple approaches and will not be elaborated here.

The quartic equation can be obtained by multiple approaches and will not be elaborated here.

Among the four values of $r_3$, only the positive real number is meaningful, while there may be more than one positive real number.

The same method as above can be used to determine other planes. In order to find out a correct solution among multiple possibilities of each plane, the following method is used: determining a first plane S1 by an adjacent right-angle method; determining the position of the plane S1 using a positive real number solution of the plane; selecting an adjacent plane S2, determining the plane by the adjacent right-angle method, and determining the position of the plane S2 using a positive real number solution; repeating the previous step to determine positions of other planes successively until all the planes are determined; if no positive real number can be found for a plane, or there is an error when searching for an intersection with the adjacent plane, the method goes back to the previous plane, uses a next positive real solution, and repeats the previous steps to determine all the planes. Since all planes are real in space, the positions of all the planes can be determined by the above method. It is assumed above that two adjacent right angles can be found for each plane. If one plane does not meet the condition of two adjacent right angles, it can be determined by an adjacent plane having a determined position and an intersection line with the adjacent plane. As shown in FIG. 2, it is assumed that S2 is perpendicular to S1, then S2 can be uniquely determined according to the position of S1 and an intersection line L1 of S1 and S2.

Specifically, in an alternative or additional method (rectangle method), a plane is determined by assuming that a wall is a rectangle and searching for four corners of the plane. Most walls in a room are rectangular, so it is logical to use four vertices of a rectangle to determine the position of a wall. The rectangle method is a particular case of the adjacent right-angle method.

Referring to FIG. 5, in the rectangle method, a line segment P1P4 must be parallel to a line segment P2P3. In the adjacent right-angle method, P1 may be any point on a line where P1P2 is located; similarly, P4 may also be any point on a line where P3P4 is located. The method of solving the rectangle method is similar to that of the adjacent right-angle method and will not be described here.

Specifically, in some embodiments (projection method), a plane is determined by a projection of a camera to the plane. If the projection of a camera lens to a plane is recorded during capture, the position of the plane (a distance from the camera to the plane is known or assumed) can be uniquely determined accordingly.

As shown in FIG. 2, the line connecting the camera position and the projection is perpendicular to the ground S1. The ground position can be determined if the camera height is known or assumed. In a practical operation, a method of acquiring/recording a projection point includes placing the camera on a tripod or stand perpendicular to the ground, where a center point of a projection of the tripod/stand on the ground is the projection point; or pressing the tripod/stand against and perpendicular to the wall, where a center point of a projection of the tripod/stand on the wall is the projection point; or marking the projection point. When other planes are being determined, a first plane S1 is determined by the projection method, and an adjacent plane S2 is selected. It is assumed that S2 is perpendicular to S1, then S2 can be uniquely determined according to the position of S1 and the intersection line L1 of S1 and S2, and all planes can be determined sequentially by the same method. In a practical operation, since almost all walls are perpendicular to the ground or ceiling, if the first plane is a wall, the ground or ceiling is selected as the first adjacent plane in the above step, and all the walls are then determined sequentially.

Specifically, in some embodiments (inclination angle projection method), the position of a plane is determined by recording a relevant point to reckon a projection point of the camera lens on the plane. This method is similar to the projection method, except that the point to be recorded is not the projection point, but the position of the projection point can be reckoned from the recorded point. The method includes placing the tripod/stand on the ground (the base is attached to the ground) but not perpendicular to the ground; or pressing the tripod/stand against the wall (the base is attached to the wall) but not perpendicular to the wall. When the tripod/stand is not perpendicular to a plane, the projection thereof on the plane is a line segment.

Referring to FIG. 6, P is the position of the camera lens, P1 is the center point of the camera stand base, P2 is the projection point on the plane, and the projection line of the stand P1P3 on the plane is P1P2. If the direction of the projection line relative to the base (determined by the relative relationship between the lens direction and the base, or by a mark on the base having a fixed position and a predictive relationship relative to the stand position) P1P2 is known, the position of the projection point P2 can be calculated according to a known stand inclination angle P3P1P2 and the known height or assumed height of the stand. All the planes can be determined by the projection method from the projection point P2.

Preferably, before the step S2 is performed, the method further includes marking a vertical correction line on the photo to correct an image tilt caused by the skew of a capture device during capture; finding a line perpendicular to the ground in the photo as the vertical correction line, or finding a horizontal line in the photo, and drawing a line perpendicular to the horizontal line in the photo as the vertical correction line; rotating the photo with the vertical correction line as a reference until the vertical correction line is perpendicular to the actual horizontal plane; and acquiring multiple vertical correction lines in different orientations to complete vertical correction.

Referring to FIG. 7, during the vertical correction, two end points of the found line segment (including the vertical line segment transformed from the horizontal line) are projected onto a spherical surface to obtain P1 and P2. Since camera is tilted, an included angle between a plane formed by the spherical center O and P1, P2 and the horizontal plane H is not a right angle. A midpoint of P1P2 is taken as P, P is projected onto H to obtain P', and the photo is rotated with a line connecting the spherical center O and P' as an axis, until the plane OP1P2 is perpendicular to the plane H.

In the method for reconstructing a three-dimensional space scene based on photographing according to the present disclosure, the step S3 includes the following steps: S31, placing the photos in a high-precision sphere, setting the lens position of a camera in the center of the sphere, and restoring the capture viewing angles of the photos in the center of the sphere; S32, presetting four frame points in the sphere, each including an upper point and a lower point, and dragging the frame points such that each point corresponds to a corner position in an actual room space to form a main frame structure of the room; or marking positions of all lower corners sequentially to form a floor outline, then finding out corresponding upper corners in combination with perpendicular wall lines, and marking positions of the upper corners to obtain a basic outline of the whole room; and S33, calculating the height of the room by a known camera capture height, and reckoning the dimensions of the room outline; or locating dimensions of the outline of a plane by placing a scale of a known length, and reckoning the dimensions of the room outline.

In a specific implementation, in the step S32, the spatial structure of a room and objects can be marked in various manners, and one of the marking manners (frame method) includes steps as follows:

Referring to FIG. 8 and FIG. 9, four frame points (P1, P2, P3, and P4) are preset on the plane S1 in the scene to form a rectangle, where the length and width of the rectangle can be changed, but the rectangular relationship must be maintained. Each frame point corresponds to an upper frame point (P1a, P2a, P3a, and P4a), and a line connecting each pair of upper and lower frame points (such as P1P1a) is perpendicular to the plane S1. Each lower frame point is moved to the corner position in the space. When the shape of the room is a regular cuboid, the eight upper and lower frame points completely describe all planes of the cuboid, thus completing the space modeling.

For a non-cuboid room, the room structure can be quickly expanded by adding four mark points, P5, P6, P7 and P8 shown in FIG. 8, of a concave-convex wall structure, and the expanded spatial structure is determined by adjusting the position and depth of the concave-convex wall. Because concave-convex structures of most walls are still rectangular or right-angled (for example, in FIG. 8, P5P6 is perpendicular to P2P5, P6P7 is perpendicular to P5P6 and P7P8 respectively, and P7P8 is perpendicular to P8P3), this method can be effectively utilized for modeling.

For any free-structured wall, the wall structure can be expanded without any restriction by adding free mark points. As shown in FIG. 9, P7 may be any point on the plane S1, P5P7 may not be perpendicular to P2P5, P5P7 may not be perpendicular to P7P8, and P7P8 may not be perpendicular to P8P3.

In a case that a corner is obscured by an object, wall lines are generally exposed as reference objects. The position of a wall line can be determined by a line connecting the frame points. The position of a corner can be determined when a vertical wall line and a horizontal wall line of the corner are determined. As shown in FIG. 8, if P4 is obscured, but P1P4 and P3P4 are partially visible, the position of P4 can still be obtained by an intersection of the two lines.

A mark line is formed between two mark points. The wall of the room is expanded by clicking the mark line, and various basic object structures of the room such as a door, an open space, an ordinary window, a bay window, and stairs are added. Basic object structures can also be added to the wall.

For a structure of more than one floor, upper and lower floors can be connected by adding stairs and staircases and connecting the staircases on the two floors; and multiple floors are expanded similarly.

A set of mark point-based data structure can be obtained through the above marking step, which records spatial information of the room wall structure and main room objects (such as a door, a door opening, an open space, an ordinary window, a bay window, and stairs), and store the same locally in the text form.

In a specific implementation, in the step S32, an outline of a certain plane can be formed by marking the position of each corner on the plane, and other planes are confirmed one by one through wall lines and corners until all planes are marked to form a room outline (sequential corner marking method). By taking marking the ground first as an example, specific steps are as follows:

The positions of all the corners are marked sequentially in the figure to form a complete floor outline. Because lower corner information of all the walls has been provided on the ground, and a ceiling plane outline is typically the same as the floor outline, the room outline can be restored by confirming the height of the room in combination with the perpendicular wall lines. One of the lower corners is selected, a corresponding upper corner is found, the position of the upper corner is marked to obtain the height of the room, and finally the basic outline of the entire room is obtained. As shown in FIG. 8, the outline of the plane S1 may be described by marking P1, P2, P3, P4, P5, P6, P7 and P8 on S1. A vertical line to S1 is then drawn from each point, thereby obtaining S2 and S3 and other planes.

In a specific implementation, a method 1 of determining the size in the step S33 includes calculating the height of the room by using a known capture height of the camera, and reckoning the dimensions of the room outline.

Referring to FIG. 10 (FIG. 10a and FIG. 10b), basic calculation methods of the corner position and the room height are as follows:

the position of the corner, the camera height h1 and a pitch angle φ1 of the camera toward the corner P1 are known, then d=tan φ1*h1; a direction angle θ of the camera toward the lower corner is known, and coordinates of the corner P1 can be calculated through the top view, i.e., (x, y, z)=(d*sin θ, −h1, d*cos θ); and room height, a pitch angle φ2 of the camera toward the upper corner and the camera height h1 are known, the upper corner P2 and the lower corner P1 are on the same vertical line, then h2=d/tan(180−φ2), and the room height h=h1+h2.

In a specific implementation, the method 2 of determining the size in the step S33 includes locating the outline dimensions of a certain plane (ground/wall) by placing a scale of a known length, and reckoning outline dimensions of the other planes accordingly.

Referring to FIG. 11, the scale is placed on the ground, and the camera height (the distance to the ground) can be calculated according to the known scale length, and subsequent steps are the same as those in the method 1. The camera height is unknown, and it is assumed that the camera height is h, an actual length of the ground scale R is known as Lr, the length measured in the coordinate system is Lr', and h and Lr' are in the same coordinate system with the same unit, then the camera's actual height h'=Lr/Lr'*h. The scale can also be placed against a certain wall, a distance from the camera to the wall can be calculated, the position of the ground is then determined according to the lower corner, and subsequent steps are the same as those in the method 1. As shown in FIG. 11, the scale R is placed on the wall s2, and the common point is that after the relative size of the located first plane (the size is any default positive value set in advance) is known, since the scale is placed on the plane, a ratio can be calculated according to the length Lr' of the scale measured in the coordinate system and the actual length Lr of the scale in the real world, that is, the ratio r=Lr/Lr', indicating that the unit length in the coordinate system corresponds to the length in the real world. If any edge of the plane has a length L' in the coordinate system, the actual length L=L'*r, and thus actual lengths of all the edges in the coordinate system can be known.

Referring to FIG. 12, the scale does not have to be attached to the ground or wall as long as a fixed angle is formed with a certain plane. The length of a projection on the plane can also be calculated by a trigonometric function, thereby determining the position of the plane. By taking the ground as an example, the scale is Pr1Pr2, the actual length of Pr1Pr2 is known, and a fixed angle between the scale and the plane is known as θ, i.e., ∠Pr1, then the actual length of Pr1Pr2' is determined as Lr according to the angle θ and the projection of the scale on the ground. The length of the projection Pr1Pr2' in the coordinate system is measured as Lr', the subsequent calculation is the same as that in the previous method, and actual lengths of all other edges are determined by the ratio r=Lr/Lr'.

Specifically, in the step S32, when the corner to be marked is obscured, if the wall lines are visible, the position of the corner is determined by an intersection of a vertical wall line and a horizontal wall line intersecting with each other. If the lower corner and wall line of the wall are both obscured and an upper corner or wall line is visible, an upper plane and the upper corner are determined first, the positions of the upper corner and the lower corner are then scaled proportionally, and the lower corner point is kept on the lower plane, so that the position of the corner can be determined.

The method for reconstructing a three-dimensional space scene based on photographing according to the present disclosure further includes step S5, connecting all rooms by comparing image information of doors or open spaces in photos of different rooms to obtain the spatial position and orientation information of each room; comparing, by means of marked doors or open spaces, pictures through the doors or open spaces in the photos, obtaining matching pictures in the photos, finding the same door or open space, and connecting the rooms having the same door or open space; calculating the positions and orientations of the connected rooms after all rooms are connected to each other, selecting a room as a connected room, traversing doors of the room to look for an unconnected room, calculating the position and orientation of the unconnected room through the position and orientation of the currently connected room in combination with the position and orientation of a door or an open space connecting the two rooms, and marking the unconnected room as a connected room; and continuing to look for an unconnected room until there is no unconnected room to complete the connection of all rooms.

The method for reconstructing a three-dimensional space scene based on photographing according to the present disclosure further includes step S6, dividing the photos by the point coordinate information collected in the step S3 to obtain a room texture map to obtain a room texture in the following way: first setting each plane as a polygon with a set of three-dimensional coordinates as vertices, and calculating the dimensions of a map by a bounding rectangle of the vertex coordinates; traversing pixel by pixel on the image, and acquiring its spatial coordinates on the polygon; traversing all the pixel points to complete a texture map of a single plane; and completing texture maps for all planes of the room sequentially.

The method for reconstructing a three-dimensional space scene based on photographing according to the present disclosure further includes step S7, obtaining a two-dimensional outline of a single room through the room model acquired by the marking system in the step S3, with height information ignored; and setting the position and orientation of each room outline according to the position coordinates and orientation information of each room obtained in the step S5, to generate the two-dimensional plane graph.

Specifically, the capture device of the photos includes a mobile phone with a fisheye lens, a panoramic camera, a camera with a fisheye lens, a general mobile phone, and a general digital camera.

In summary, in the method for reconstructing a three-dimensional space scene based on photographing according to the present disclosure, a three-dimensional space model of a scene while including texture and dimensions can be restored with no details lost; no incomplete 3D models will be generated due to incomplete scanning; furniture, interior decoration, or the like will not cause any errors in generating 3D models. The three-dimensional space scene can be edited and modified quickly and conveniently, and a two-dimensional floor plan with dimensions and adequate accuracy can be generated at the same time. The method supports a wide range of capture manners including, but not limited to, a mobile phone with a fisheye lens, a panoramic camera, a camera with a fisheye lens, a general mobile phone, and a general digital camera, thus having a low cost.

In the description herein, an internal space of a room is used as an illustrative example to illustrate the techniques. The techniques are also similarly used to reconstruct three-dimensional models of other objects than an internal space of a room. For example, the techniques are used to reconstruct a three-dimensional view of a piece of furniture in a room. The techniques are also used to reconstruct a three-dimensional view of an exterior shape of an architectural feature or structure, e.g., a building.

Although the present disclosure has been disclosed above through preferred embodiments, the present disclosure is not intended to be limited thereto. Some modifications and improvements can be made by any skilled in the art without departing from the spirit and scope of the present disclosure. Therefore, the protection scope of the present disclosure should be defined by the claims.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
obtaining a two-dimensional image of an object through an image capturing device, the obtaining the two-dimensional image including recording a projection point of the image capturing device on a plane of the object;
determining a joint point of three perpendicularly intersecting edge lines of the object based on the two dimensional image;
determining a first two-dimensional plane of the object based on the projection point of the image capturing device on the plane of the object and the joint point;
determining a second two-dimensional plane of the object based on the first two-dimensional plane; and
generating a three-dimensional model of the object based on the first two-dimensional plane and the second two-dimensional plane.

2. The method of claim 1, wherein the second two-dimensional plane is determined based on an architectural relationship between the second two-dimensional plane and the first two-dimensional plane.

3. The method of claim 1, further comprising determining a size of the object based on a height of a view point where a camera is positioned to capture the two-dimensional image of the object and a projection point of the view point on the first two-dimensional plane.

4. The method of claim 1, wherein the obtaining the two-dimensional image of the object includes obtaining a panoramic image of the object.

5. The method of claim 1, wherein the determining the first two-dimensional plane of the object includes the determining the joint point.

6. The method of claim 1, wherein the determining the first two-dimensional plane of the object includes determining four corners of the first two-dimensional plane.

7. The method of claim 1, wherein the image capturing device includes a camera and a supporting device, and the determining the first two-dimensional plane of the object includes:
   determining a projection line of the supporting device on the two-dimensional image; and
   reckoning the projection point of the camera based on the projection line.

8. The method of claim 1, wherein the determining the first two-dimensional plane of the object includes determining three sequentially intersecting edge lines on the first two-dimensional plane, the second edge line perpendicular to both the first and the third edge lines.

9. A system, comprising:
   a user device having a camera, the camera being configured to capture a two-dimensional image of an internal space; and
   a cloud-based server communicatively coupled to the user device, the cloud-based server including a processor and a storage unit, the storage unit containing computer executable instructions, which, when executed by the processor, configure the processor to perform actions including:
      receiving the two-dimensional image of the internal space captured by the camera of the user device;
      determining a projection point of the camera on a plane of the internal space, the projection point being recorded when the camera captures the two-dimensional image;
      determining a joint point of three perpendicularly intersecting edge lines of the internal space based on the two-dimensional image;
      determining a first two-dimensional plane of the internal space based on the joint point and the projection point of the camera;
      determining a second two-dimensional plane of the internal space based on the first two-dimensional plane; and
      displaying a three-dimensional representation of the internal space based on the first two-dimensional plane and the second two-dimensional plane.

10. The system of claim 9, wherein the user device is further configured to sense a height of a position of the camera with respect to a floor of the internal space when the camera captures the two-dimensional image of the internal space; and
   wherein the processor is further configured to determine a size of the first two-dimensional plane based on the height of the position sensed by the user device and a projection point of the camera on the first two-dimensional plane.

11. A method, comprising:
   receiving a two-dimensional image of an internal space, the two-dimensional image captured through an image capturing device;
   determining a projection point of the image capturing device on a plane of the internal space, the projection point being recorded when the image capturing device captures the two-dimensional image;
   determining one or more of a joint point of three perpendicularly intersecting edge lines of the internal space or an edge line of the internal space based on the two-dimensional image;
   determining a two-dimensional plane of the internal space based on the one or more of the joint point or the edge line of the internal space and the projection point of the image capturing device on the plane of the internal space; and
   determining a three-dimensional representation of the internal space based on the two-dimensional plane.

12. The method of claim 11, wherein the determining the two-dimensional plane of the internal space includes:
   determining a first two-dimensional plane based on one or more of the joint point or the edge line of the internal space; and
   determining a second two-dimensional plane based on the first plane.

13. The method of claim 12, wherein the first two-dimensional plane is a floor plane of the internal space and the second two-dimensional plane is a wall plane of the internal space.

14. The method of claim 11, wherein the determining the two-dimensional plane of the internal space includes one or more of:
   determining three sequentially intersecting edge lines based on at least one of the joint point or the edge line, the three sequentially intersecting edge lines including a first edge line, a second edge line and a third edge line, the second edge line perpendicularly intersecting both the first edge line and the second edge line, respectively, the first edge line not intersecting the third edge line; and
   determining four corners of the two-dimensional plane based on the at least one of the joint point or the edge line.

15. The method of claim 11, wherein the determining the two-dimensional plane of the internal space includes:
   recording a position point related to a position of a camera in obtaining the two-dimensional image to estimate the projection point of the camera on the two-dimensional plane.

16. The method of claim 11, comprising:
   determining a dimension ratio between the three-dimensional representation of the internal space and the internal space; and
   scaling a feature in the three-dimensional representation based on the dimension ratio.

17. The method of claim 11, wherein the determining the three-dimensional representation of the internal space includes:
   determining a first three-dimensional representation of a first portion of the internal space and a second three-dimensional representation of a second portion of the internal space; and
   combining the first three-dimensional representation and second three-dimensional representation based on corresponding features in the first three-dimensional representation and the second three-dimensional representation.

18. The method of claim 11, comprising generating a two-dimensional floorplan representation of the internal space based on the three-dimensional representation of the internal space.

19. The method of claim 18, wherein the generating the two-dimensional floorplan representation includes:
- generating a first two-dimensional floorplan representation based on a first three-dimensional representation of a first portion of the internal space by removing height information;
- generating a second two-dimensional floorplan representation based on a second three-dimensional representation of a second portion of the internal space by removing height information; and
- combining the first two-dimensional floorplan representation and the second two-dimensional floorplan representation based on corresponding features in the first two-dimensional floorplan representation and the second two-dimensional floorplan representation.

20. The method of claim 18, wherein the generating the two-dimensional floorplan representation includes:
- generating a first three-dimensional representation of a first portion of the internal space;
- generating a second three-dimensional representation of a second portion of the internal space;
- generating a combined three-dimension representation by combining the first three-dimensional representation and the second three-dimensional representation based on corresponding features in the first three-dimensional representation and the second three-dimensional representation; and
- generating the two-dimensional floorplan representation based on the combined three-dimensional representation by removing height information.

\* \* \* \* \*